United States Patent
Jacobson et al.

(10) Patent No.: US 11,693,644 B2
(45) Date of Patent: Jul. 4, 2023

(54) HIGH PERFORMANCE COMPUTING NODE CONFIGURATION MECHANISM

(71) Applicant: Hewlett Packard Enterprise Development LP, Houston, TX (US)

(72) Inventors: Erik Daniel Jacobson, Eagan, MN (US); Scott Titus, Eagan, MN (US)

(73) Assignee: Hewlett Packard Enterprise Development LP, Spring, TX (US)

(*) Notice: Subject to any disclaimer, the term of this patent is extended or adjusted under 35 U.S.C. 154(b) by 338 days.

(21) Appl. No.: 16/820,883

(22) Filed: Mar. 17, 2020

(65) Prior Publication Data

US 2021/0294587 A1    Sep. 23, 2021

(51) Int. Cl.
G06F 9/54 (2006.01)
G06F 8/61 (2018.01)
G06F 8/65 (2018.01)
G06F 11/30 (2006.01)
G06F 9/445 (2018.01)

(52) U.S. Cl.
CPC .............. *G06F 8/63* (2013.01); *G06F 8/65* (2013.01); *G06F 9/44505* (2013.01); *G06F 9/542* (2013.01); *G06F 11/3006* (2013.01)

(58) Field of Classification Search
CPC ................................ G06F 9/445; G06F 11/30
See application file for complete search history.

(56) References Cited

U.S. PATENT DOCUMENTS

| | | | |
|---|---|---|---|
| 7,337,221 B2 | 2/2008 | Radi et al. | |
| 9,401,949 B1* | 7/2016 | Kolam | H04L 67/568 |
| 9,507,843 B1 | 11/2016 | Madhavarapu et al. | |
| 10,686,905 B1* | 6/2020 | Word | H04L 67/1097 |
| 10,853,089 B2* | 12/2020 | Artman | G06F 8/654 |
| 11,068,251 B2* | 7/2021 | Karlsson | G06F 8/65 |
| 11,269,610 B1* | 3/2022 | Nguyen | G06F 8/65 |
| 2004/0088694 A1* | 5/2004 | Ho | G06F 8/658 |
| | | | 717/170 |

(Continued)

FOREIGN PATENT DOCUMENTS

| | | |
|---|---|---|
| WO | 2010/034608 A1 | 4/2010 |
| WO | WO-2010034608 A1 | 4/2010 |

OTHER PUBLICATIONS

IBM, "Architecture," 2020, pp. 1-13, Retrieved from the Internet on Feb. 20, 2020 at URL: <.ibm.com/support/knowledgecenter/SSFC4F_1.1.0/getting_started/architecture.html>.

(Continued)

*Primary Examiner* — Phil K Nguyen
(74) *Attorney, Agent, or Firm* — Mauriel Kapouytian Woods LLP

(57) ABSTRACT

A high performance (HPC) system is described. The system includes a head node comprising one or more processors to execute a configuration manager to receive a database trigger and transmit configuration updates including configuration input data and a plurality of compute nodes, communicatively coupled to the head node, each compute node comprising one or more processors to execute a client to receive a configuration update, generate a configuration file based on configuration input data included in the configuration update and configure the compute node based on the configuration file.

19 Claims, 6 Drawing Sheets

(56) References Cited

U.S. PATENT DOCUMENTS

| | | | | |
|---|---|---|---|---|
| 2005/0039178 A1* | 2/2005 | Marolia | ............... | H04W 8/245 |
| | | | | 717/174 |
| 2005/0257205 A1* | 11/2005 | Costea | ..................... | G06F 8/65 |
| | | | | 717/168 |
| 2006/0294211 A1 | 12/2006 | Amato | | |
| 2010/0262816 A1* | 10/2010 | Klings | ............... | G06F 9/44536 |
| | | | | 713/1 |
| 2011/0093516 A1* | 4/2011 | Geng | ................ | H04L 41/0859 |
| | | | | 707/827 |
| 2012/0102477 A1* | 4/2012 | Kim | ....................... | G06F 8/654 |
| | | | | 717/169 |
| 2012/0180038 A1* | 7/2012 | Hu | ......................... | G06F 8/654 |
| | | | | 717/173 |
| 2013/0060819 A1 | 3/2013 | Lambeth et al. | | |
| 2013/0204928 A1* | 8/2013 | Yu | ......................... | G06Q 10/10 |
| | | | | 709/203 |
| 2015/0215374 A1* | 7/2015 | Hundt | .................... | H04L 67/02 |
| | | | | 709/219 |
| 2016/0212101 A1* | 7/2016 | Reshadi | ............. | H04L 63/0428 |
| 2017/0131991 A1* | 5/2017 | Su | ............................. | G06F 8/65 |
| 2018/0307479 A1* | 10/2018 | Subramanian | .......... | G06F 8/658 |
| 2019/0095196 A1* | 3/2019 | Anderson | ................ | G06F 8/71 |
| 2019/0098071 A1 | 3/2019 | Bitincka et al. | | |
| 2021/0072977 A1* | 3/2021 | Giri | .......................... | G06F 8/63 |

OTHER PUBLICATIONS

IBM Knowledge Center, "Architecture", available online at <https://www.ibm.com/support/knowledgecenter/SSFC4F_1.1.0/getting_started/architecture.html>, retrieved on Apr. 23, 2020, 13 pages.

* cited by examiner

HIGH PERFORMANCE COMPUTING NODE CONFIGURATION MECHANISM

BACKGROUND

High-performance computing (HPC) provides the ability to process data and perform complex calculations at high speeds. An HPC cluster is a collection of many separate servers (computers), called nodes, which are connected via a fast interconnect. An HPC cluster includes different types of nodes that perform different tasks, including a head node, data transfer node, compute nodes and a switch fabric to connect all of the nodes. Exascale computing refers to a HPC system that is capable of at least a quintillion (e.g., a billion billion) calculations per second (or one exaFLOPS).

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
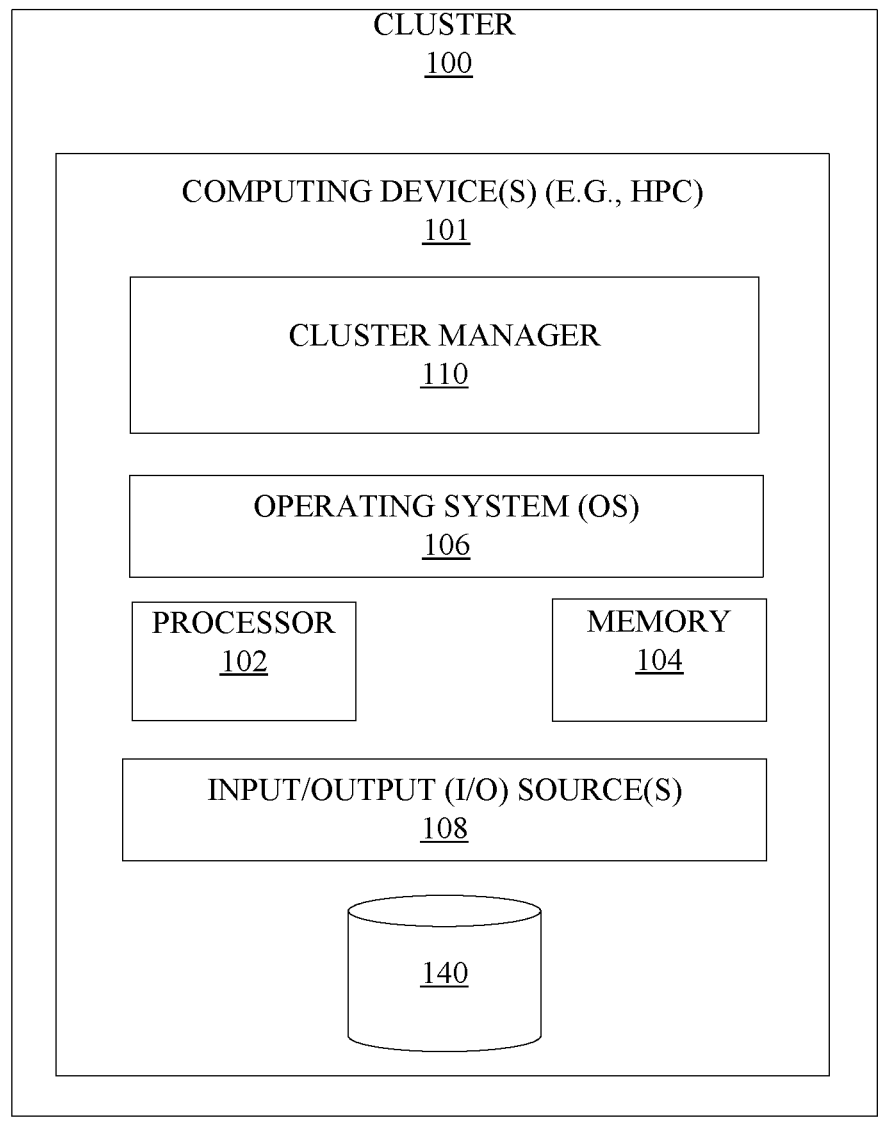
FIG. 1 illustrates one embodiment of a system.

Exascale clusters include thousands of nodes that need to be configured via configuration files. These configuration files include anything needed by a node or cluster manager to function (e.g., a cluster hosts file (/etc/hosts) or network configuration). In addition, HPC clusters are often tuned at a low level for things like memory bandwidth, networking, and the like. In a conventional cluster manager, a system image (e.g., a serialized copy of the state of a computer system) is created by a system administrator and provisioned to the nodes. However, the image is often only valid for one set of hardware due to drivers and configuration within the image. Thus, much of the configuration for a node is performed in the image itself.

In contrast, it is desirable for the image to be generic as it can apply to different types of nodes within the cluster. For this reason, images are kept as generic as possible to enable node and network configuration to be performed on the node. Accordingly, a single image may apply to multiple types of hardware (e.g., assuming the architecture matches). Two types of systems are implemented to perform such operations. One such system allows the nodes to configure themselves as they boot up based on information from a database. However, this method results in a significant increase in database traffic since each node request is typically a separate database call, and many nodes may be simultaneously booting. This often results in database saturation on the head node.

The other configuration method creates or updates files in advance on a head node, stores the files into a hierarchy and deploys the changes to the nodes using a synchronization function from the head node to all nodes in a cluster. The problem with this method is that a cluster may have different operating system (OS) distributions (e.g., Linux Red Hat or SUSE Linux Enterprise Server (SLES)) and different versions of any given distribution (e.g., RHEL7, RHEL8). Moreover, the head node may not be running the same OS version of Linux as the nodes. While the database may maintain this information, verifying a node is running a certain OS distribution (e.g., verses being configured to run it next reboot) is a complicated problem.

Further, a head node generating configuration files for a different OS version typically means that the head node needs to recognize a configuration syntax of each distribution in advance. This is even more complicated with configuration file paths. For example, one distribution may choose to store a configuration file in a different location than another. This becomes even more complicated when the OS versions are updated over time. The head node cannot be a generic solution if it must know all paths and configuration files for all nodes, and thus must be continually patched.

In embodiments, a node configuration mechanism is provided that incudes configuration clients operating at each of a plurality of HPC compute nodes registering with a configuration manager to receive configuration updates. In further embodiments, the configuration manager transmits configuration updates including configuration input data to one or more of the registered configuration clients in response to detecting a change at the database. In still further embodiments, each of the configuration clients receive the configuration input data and generates (or updates) a configuration file based on the configuration input data. Subsequently, each configuration client configures its respective compute node according to the configuration file.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of a cluster 100. As shown in FIG. 1, data cluster 100 includes one or more computing devices 101 that operate as high-performance computing (HPC) cluster components. In embodiments, a computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 includes a server computer that may be further in communication with one or more databases or storage repositories, such as database 140, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

According to one embodiment, computing device 101 implements a cluster manager 110 to manage cluster 100. In one embodiment, cluster manager 110 provides for provisioning, management (e.g., image management, software updates, power management and cluster health management, etc.) and monitoring of cluster nodes. In a further embodiment, cluster manager 110 provides for configuration of cluster compute nodes. In such an embodiment, cluster manager 110 includes configuration components, such as a configuration manager operating on a head node and a configuration client operating on each compute node in the cluster.

In one embodiment, the configuration manager receives notifications of database changes that may require configuration changes between the cluster database (e.g., database 140) and the configuration manager. Configuration clients register with the configuration manager to receive notification of configuration changes as well as input data to facilitate generation of configuration files. By keeping a cache of the dataset, clients recognize changes that have occurred since a previous notification, and may use the information to target only configuration files that are impacted by a given database change. In a further embodiment, a database call is made by the configuration manager upon being notified about database changes. In response, the configuration manager transmits configuration input data associated with the changes to the configuration clients at compute nodes that are impacted by the changes. Subsequently, the configuration clients configure their respective compute nodes according to the update.

Figure 2:
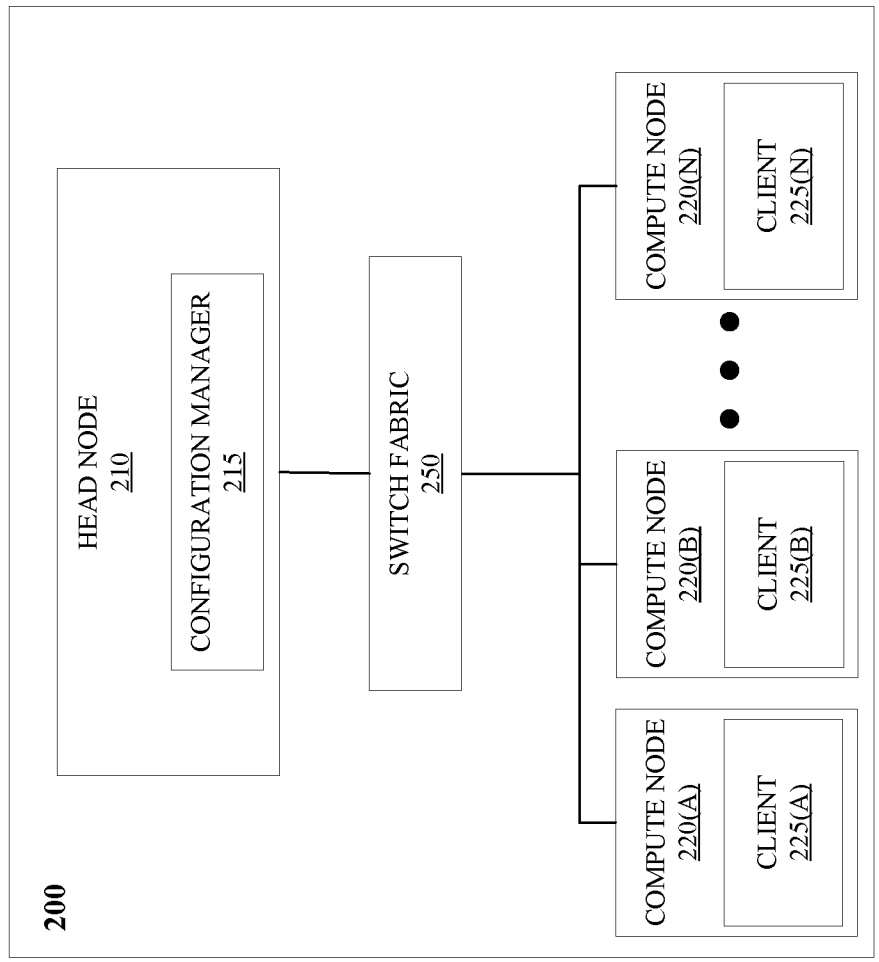
FIG. 2 is a block diagram illustrating one embodiment of a HPC cluster.

FIG. 2 is a block diagram illustrating one embodiment of a HPC cluster 200. As shown in FIG. 2, cluster 200 includes a head node 210 coupled to compute nodes 220 (e.g., compute nodes 220(A)-220(N)) coupled via a switch fabric 250. Head node 210 provides management and job scheduling services to the cluster of compute nodes 220. In one embodiment, head node 210 operates as a launching point for workloads (or jobs) for processing at compute nodes 220. Compute nodes 220 performs computational operations to execute workloads. In one embodiment, compute nodes 220 operate in parallel to process the workloads. Switch fabric 250 comprises a network of switches that interconnect head node 210 and compute nodes 220.

Figure 3:
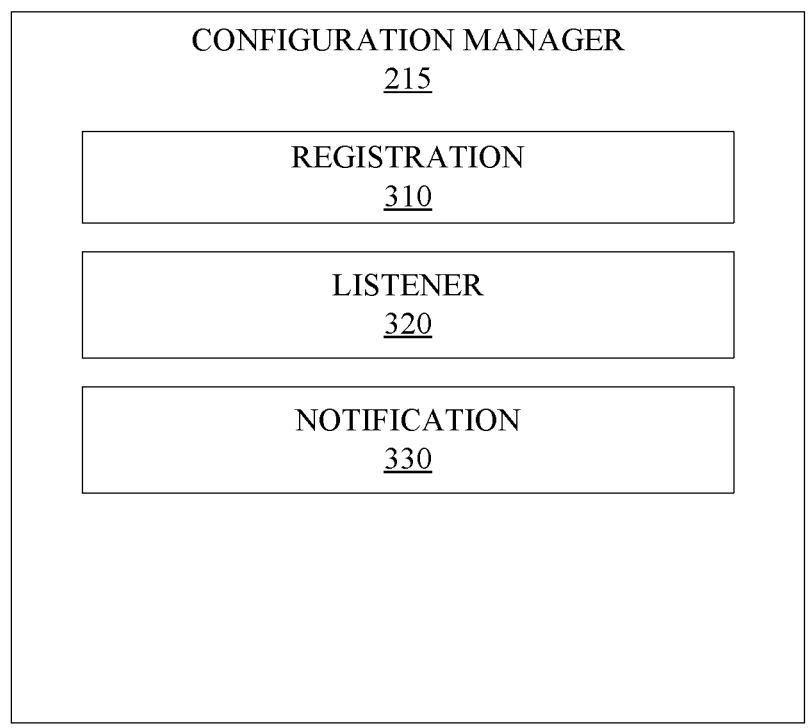
FIG. 3 is a block diagram illustrating one embodiment of a configuration manager.

Head node 210 includes configuration manager 215 to facilitate configuration changes. FIG. 3 is a block diagram illustrating one embodiment of configuration manager 215, including registration logic 310, listener 320 and notification engine 330. Registration logic 310 registers with the system database (e.g., database 140), or a backend, to receive database changes. Accordingly, registration logic 310 registers for database trigger. In one embodiment, the registration comprises a general registration (e.g., all changes). However in other embodiments the registration includes only changes that effect the configuration of registered nodes. For example, if a new compute node is added to the database, some nodes need to include the new node information within one or more configuration files.

Listener 320 operates as an interface to listen to configuration clients. In one embodiment, listener 320 includes a separate connection to each configuration client to receive registration information from the clients. In such an embodiment, listener 320 is coupled to each configuration client via a Transport Layer Security (TLS) socket connection. Notification engine 320 notifies and provides configuration updates to clients including configuration input data whenever a database change is detected.

According to one embodiment, notification engine 320 determines which clients are registered to receive configuration updates, as well as the clients that are impacted by the detected change. Subsequently, notification engine 320 transmits the configuration input data to those clients determined to be impacted by the change (e.g., based on the needs identified by the client registrations). In a further embodiment, the configuration input data includes configuration information implemented to configure. In such an embodiment, the configuration information includes dictionaries, arrays, and similar data structures. The same configuration input data may be transmitted to all nodes, or may be information transmitted to one or more specific nodes.

According to one embodiment, configuration manager 215 operates according to various operation modes. In such an embodiment, configuration manager 215 operates in an asynchronous mode as a default mode. In the asynchronous mode, configuration manager 215 detects database changes and automatically transmits configuration input data to nodes determined to be affected by the changes. Another operating mode is a multicast mode. In the multicast mode, a determination is made as to whether the configuration input data includes data for all nodes. If so, a multicast notification including the configuration input data is simultaneously transmitted to all nodes in the cluster. Thus, configuration input data is transmitted as a multicast upon a determination that the data includes information for all nodes (e.g., all nodes get the same data at the same time).

Another mode is a synchronous mode in which a configuration request is received via a user interface (e.g., a Command Line Interface (CLI)). In this embodiment, the configuration input data is specified in the configuration request and transmitted to nodes specified in the request. Yet another mode is a differed mode. During certain times, such as the initial discovery of the nodes in the cluster, it may not desirable for configuration manager 215 to keep contacting all the nodes about database changes. This situation can be volatile, and thus result in lots of unnecessary notifications.

The deferred mode, enables a system administrator via the user interface (or cluster manager tools) to indicate that no cluster change events will be transmitted to the nodes. Once the deferred mode is stopped configuration manager 215 may perform a one-time synchronous update (as described above). Subsequently, clients will operate in their normal mode waiting for notifications.

Figure 4:
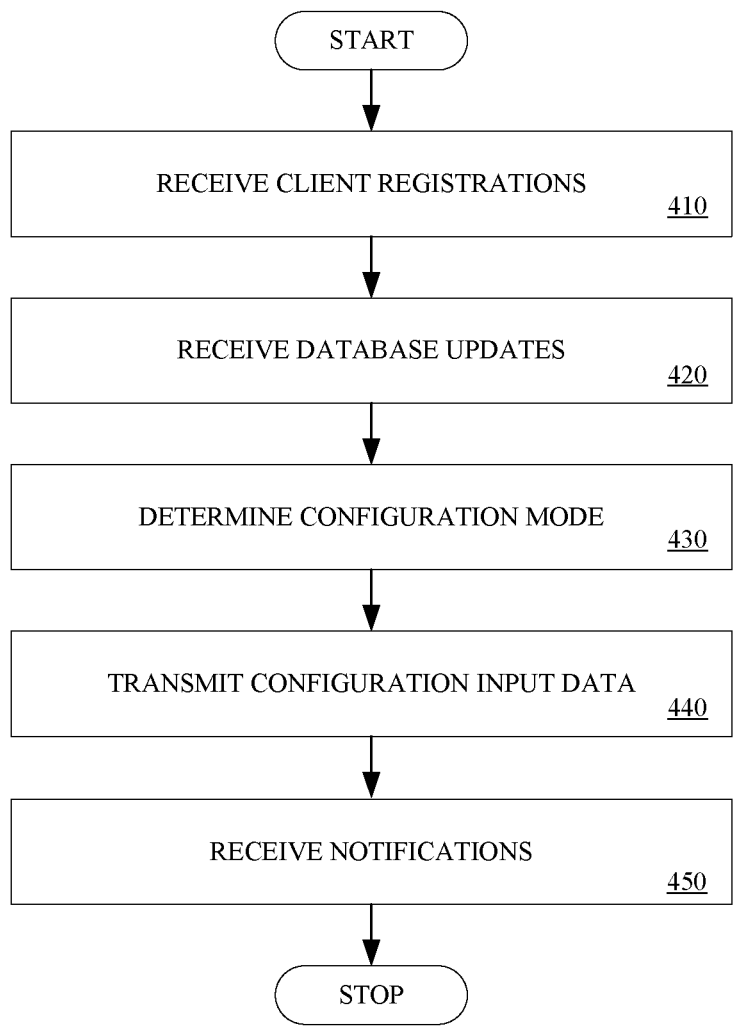
FIG. 4 is a flow diagram illustrating one embodiment of a method performed by a configuration manager.

FIG. 4 is a flow diagram illustrating one embodiment of a method performed by a configuration manager. At processing block 410, the configuration manager receives registrations from compute node clients within the cluster. At processing block 420, one or more database updates are received. As discussed above, the database updates may comprise only changes that effect node configuration. At processing block 430, a determination is made as to the type of mode (e.g., asynchronous, multicast, synchronous, or deferred) the configuration manager is operating.

At processing block 440, configuration input data is transmitted to the compute nodes based on the operating mode. For example, the configuration manager automatically transmits configuration input data to nodes determined to be affected by the changes while operating in the asynchronous, or may simultaneously transmit the configuration input data to all nodes in the cluster when operating in the multicast node. At processing block 450, notifications are received from the compute nodes indicated that configuration files associated with the configuration input data has been uploaded.

Figure 5:
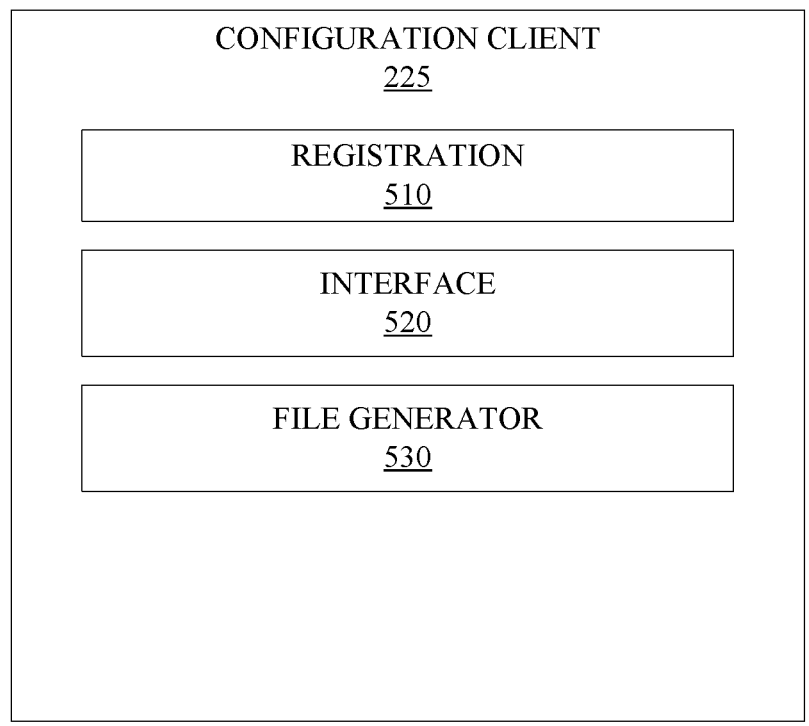
FIG. 5 is a block diagram illustrating one embodiment of a configuration client.

Referring back to FIG. 2, compute nodes 220 each include a configuration client 225 (e.g. 225(A)-225(N)) to receive and instantiate the configuration input data as configuration information at its respective compute node 220. FIG. 5 is a block diagram illustrating one embodiment of a configuration client 225. According to one embodiment, a configuration client 225 is started at a compute note when the compute node is powered (or booted) up. In such an embodiment, a node 220 configuration client 225 applies the most recent configuration to the node 220 in order to maintain cluster consistency since the node has no way to know which configuration changes it has missed while it was powered down.

Configuration client 225 includes registration logic 510, interface 520 and file generator 530. Registration logic 510 registers with configuration manager 215. In one embodiment, the registration may be configured as a general registration (e.g., to receive all updates), or a limited registration (e.g., a registration to receive only a subset (or specific types) of update data). Interface 520 receives the configuration input data. In one embodiment, interface 420 receives a first copy of the configuration input data immediately after registration. Upon receiving the data, file generator 530 updates the configuration file for the compute node. According to one embodiment, updating (or changing) a configuration file may include creating a new configuration file, or modifying an existing configuration file to adjust some settings within the file.

In a further embodiment, interface may receive subsequent copies of configuration input data (e.g., upon configuration manager 215 detecting a database change). As a result, file generator 530 analyzes a configuration update to determine one or more changes in the configuration input data from the previous receipt of configuration input data. Subsequently, file generator 530 targets the configuration adjustments so that only the changed components of the configuration file indicated in the configuration input data is changed. Subsequently, the compute node is configured according to the generated configuration file. Interface 520 notifies configuration manager 215 once the configuration changes have been completed.

In yet another embodiment, a notification is transmitted to configuration manager 215 upon a determination that a node 220 fails to be properly configured. Subsequently, the notification is logged at configuration manager 215. This provides a means to alert system administrators of nodes that may be incorrectly configured. As discussed above, only nodes that have configuration files that need to be changed receive configuration input data. Thus, if a setting is changed that only a subset of nodes (e.g., 10 nodes out of 10,000), configuration manager 215 only transmits configuration input data to the 10 nodes that need the change.

Figure 6:
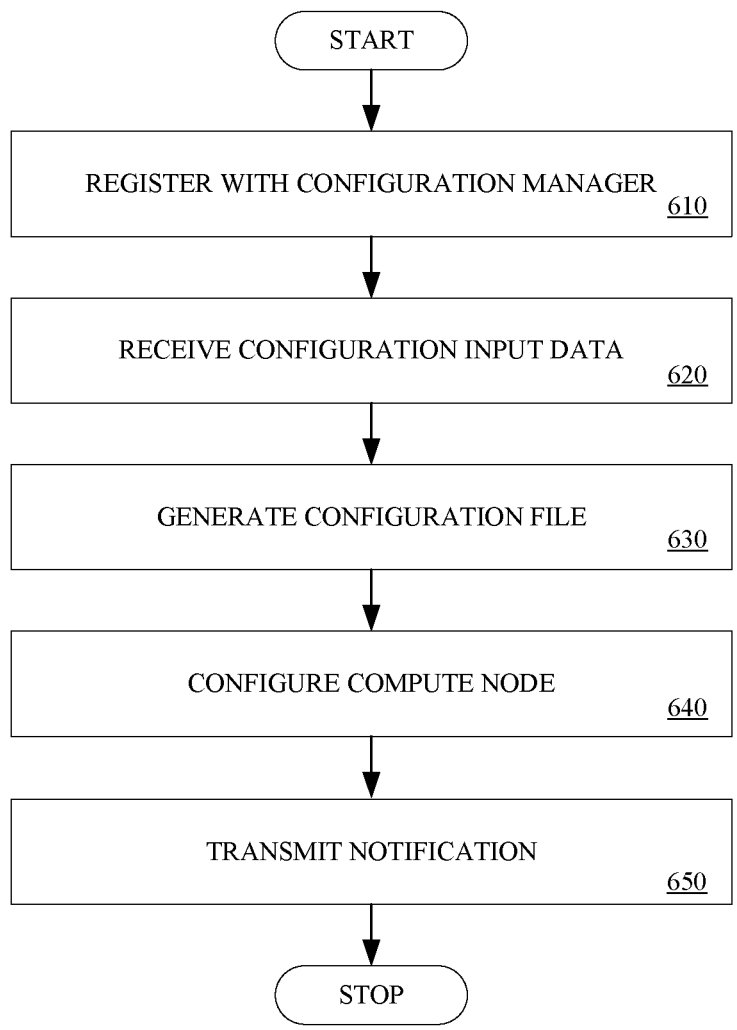
FIG. 6 is a flow diagram illustrating one embodiment of a method performed by a configuration client.

FIG. 6 is a flow diagram illustrating one embodiment of a method performed by a configuration client. At processing block 610, the client registers with the configuration manager. At processing block 620, configuration input data is received indicating that a database update relevant to the client has been received at the configuration manager. At processing block 630, a configuration file is generated (or modified) based on the configuration input data. As discussed above, a new configuration file may be generated (e.g., including the configuration input data), or an existing configuration file may be modified based on changes in the configuration input data (e.g., since receipt of previous configuration input data). At processing block 640, the compute node is configured using the configuration file. At processing block 650, a notification is transmitted to the configuration manager indicating that the configuration changes have been completed.

Clients 225 also operate in various modes. In one embodiment, clients 225 in a default (or daemon mode) starting at boot time and stopping only when the node is powered down. When in daemon mode, client 225 blocks on a socket, waiting for a request from the configuration manager 215. Once a request is acknowledged, the configuration manager 215 transmits the configuration input data. Subsequently, the client applies the necessary configuration changes to the node, as discussed above. Once the configuration changes are complete, the client 225 notifies configuration manager 215 that the configuration has completed, and blocks on the socket for the next request.

Another mode is the on demand mode in which configuration manager 215 starts the client 225 on each node with an Secure Shell (SSH) start command. In response the client 225, on the initial start, registers with the configuration manager 215, which immediately transmits an update request to the client 225 Subsequently, client 225 applies the configuration updates needed on the node (e.g., based on node type and dataset cache differences). Once the configuration updates have been applied, the client 225 notifies configuration manager 215 of completion and terminates.

According to one embodiment, upon bootup, a client 225 operates using the same process as performed in on-demand mode. Accordingly, client 225 registers with configuration manager 215, which immediately submits a configuration change request that the client 225 receives and applies. Once the configuration is applied, the client 225 notifies configuration manager 215 of completion, and either blocks on a socket for additional requests (e.g., daemon mode) or terminates (on-demand mode).

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system comprising:
   a head node comprising one or more processors to execute a configuration manager to receive a database trigger in response to detecting one or more changes at a database and transmit configuration updates including configuration input data; and
   a plurality of compute nodes, communicatively coupled to the head node as a plurality of configuration clients of the configuration manager, each one of the plurality of compute nodes comprising one or more processors to execute a corresponding configuration client to:
   receive a configuration update based on a registration with the configuration manager, wherein the registration is based on the database trigger and includes the one or more changes that effect the corresponding configuration client,
   analyze the configuration update to determine the one or more changes in configuration input data that effect the corresponding configuration client,
   generate a configuration file based on the one or more changes in the configuration input data; or modify an existing configuration file based on the one or more changes in the configuration input data included in the configuration update from a previous receipt of configuration input data,
   determine one of configuration files, selected from the generated configuration file or the modified existing configuration file, to configure the corresponding configuration client based on the analyzed configuration update, and
   configure one of the plurality of compute nodes based on the determined configuration file.

2. The system of claim 1, wherein the configuration manager is coupled to each of the configuration clients with a separate connection.

3. The system of claim 2, wherein the configuration manager receives registration information from one or more of the corresponding configuration clients indicating that the corresponding configuration clients are to receive configuration updates including the one or more changes that effect the corresponding configuration clients.

4. The system of claim 3, wherein the configuration manager determines the one or more of the corresponding configuration clients that are to receive the configuration updates based on the registration information.

5. The system of claim 4, wherein the registration includes configuration updates that effect all the plurality of compute nodes.

6. The system of claim 4, wherein the registration includes configuration updates that effect a subset of the plurality of compute nodes.

7. The system of claim 2, wherein the configuration manager transmits configuration updates in one or more operation modes.

8. The system of claim 2, wherein the configuration manager receives a notification from a configuration client indicating that a compute node has been configured based on the configuration file.

9. The system of claim 2, wherein the corresponding configuration client executes configuration adjustments based on changed components in the configuration file including configuration input data that effect the corresponding configuration client.

10. The system of claim 1, wherein the client transmits a notification to the configuration manager based on a determination that configuration completed or failed in the compute node.

11. A method to facilitate each one of a plurality of compute nodes configuration as a corresponding configuration client of a plurality of configuration clients of the configuration manager, comprising:
   receiving configuration updates from a head node based on a registration with the configuration manager, wherein the registration is based on database trigger in response to detecting one or more changes at a database and includes the one or more changes that effect the corresponding configuration client, wherein the configuration updates include configuration input data;
   analyzing the configuration update to determine the one or more changes in configuration input data that effect the corresponding configuration client;
   generating a configuration file based on the one or more changes in the configuration input data; or modifying an existing configuration file based on the one or more changes in the configuration input data included in the configuration update from a previous receipt of configuration input data;
   determining one of configuration file, selected from the generated configuration file or the modified existing configuration file, to configure the corresponding configuration client based on the analyzed configuration update; and
   configuring one of the plurality of compute nodes based on the determined configuration file.

12. The method of claim 11, further comprising transmitting registration information to the head node a registration including configuration updates that are to be received.

13. The method of claim 11, further comprising executing configuration adjustments based on changed components in the configuration file including configuration input data that effect the corresponding configuration client.

14. The method of claim 13, further comprising transmitting a notification indicating that the compute node failed to be properly configured.

15. The method of claim 13, further comprising transmitting a notification indicating that a compute node has been configured based on the configuration file.

16. A non-transitory machine-readable medium storing instructions which, when executed by a processor, cause the processor to:

receive configuration updates from a head node based on a registration with the configuration manager, wherein the registration is based on database trigger in response to detecting one or more changes at a database and includes the one or more changes that effect the corresponding configuration client, wherein the configuration updates include configuration input data;

analyze the configuration update to determine the one or more changes in configuration input data that effect the corresponding configuration client;

generate a configuration file based on the one or more changes in the configuration input data; or modify an existing configuration file based on the one or more changes in the configuration input data included in the configuration update from a previous receipt of configuration input data;

determining one of configuration file, selected from the generated configuration file or the modified existing configuration file, to configure the corresponding configuration client based on the analyzed configuration update; and configure a compute node based on the determined configuration file.

17. The non-transitory machine-readable medium of claim 16, storing instructions which, when executed by a processor, cause the processor to execute configuration adjustments based on changed components in the configuration file including configuration input data that effect the corresponding configuration client.

18. The non-transitory machine-readable medium of claim 17, storing instructions which, when executed by a processor, cause the processor to transmit a notification indicating that the compute node failed to be properly configured.

19. The non-transitory machine-readable medium of claim 17, storing instructions which, when executed by a processor, cause the processor to transmit a notification indicating that a compute node has been configured based on the configuration file.

* * * * *